A. E. PAYNE.
Improvement in Potato Planters.
No. 121,957. Patented Dec. 19, 1871.
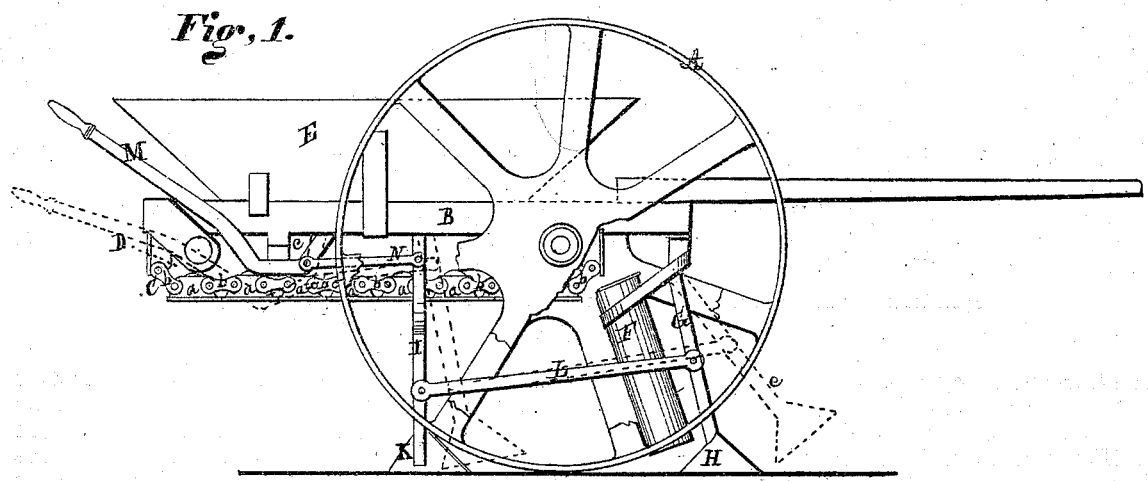
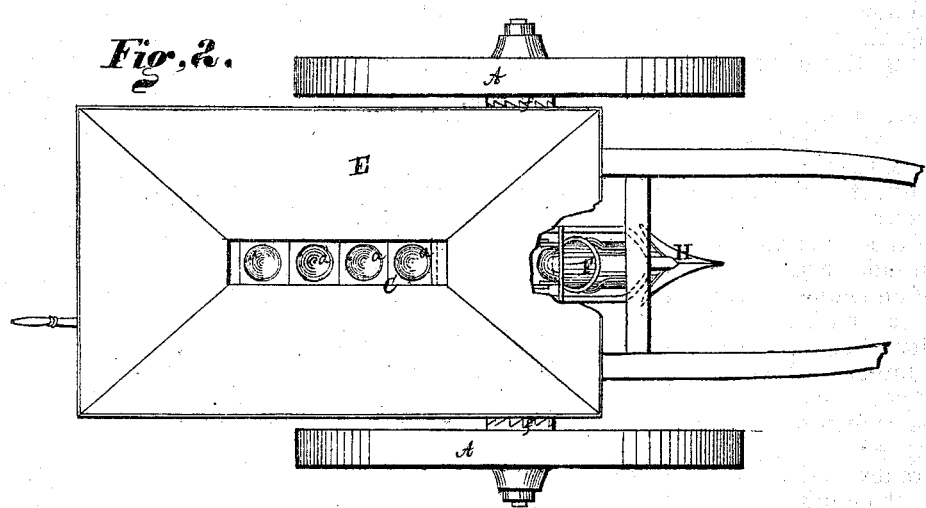
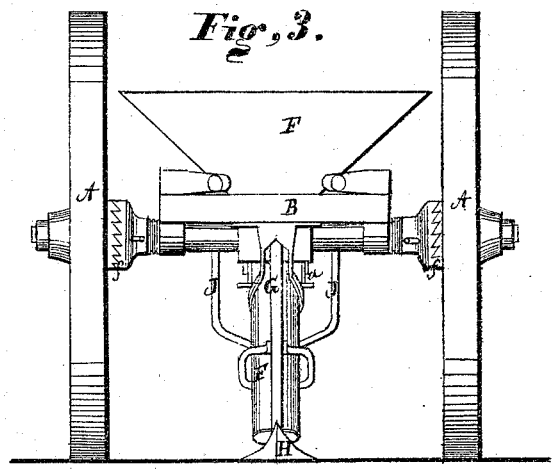
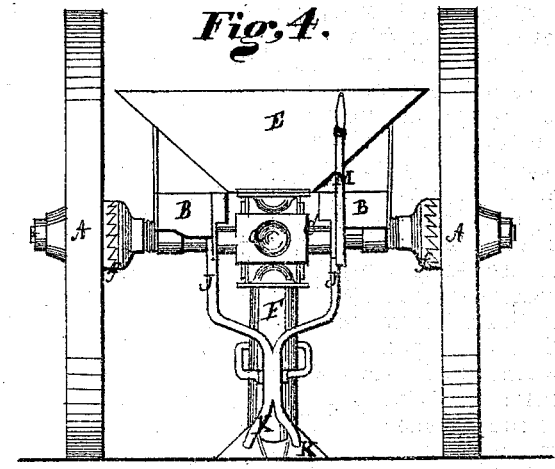
Witnesses
J. H. Burridge.
A. R. Page.
Inventor.
A. E. Payne.
per Burridge & Co.
Attys

121,957

UNITED STATES PATENT OFFICE.

ALBERT E. PAYNE, OF JONESVILLE, MICHIGAN.

IMPROVEMENT IN POTATO-PLANTERS.

Specification forming part of Letters Patent No. 121,957, dated December 19, 1871.

*To all whom it may concern:*

Be it known that I, ALBERT E. PAYNE, of Jonesville, in the county of Hillsdale and State of Michigan, have invented a certain new and Improved Potato-Planter; and I do hereby declare that the following is a full, clear, and complete description thereof, reference being had to the accompanying drawing making part of this specification.

Figure 1 is a side elevation of the machine. Fig. 2 is a plan view. Fig. 3 is a front view. Fig. 4 is a view of the rear end.

Like letters of reference denote like parts in the different views.

The object of this invention is for planting potatoes either in hills or drills; and which invention consists of an endless chain of cups revolving lengthwise the machine, said cups having a holding-capacity of two or three small potatoes or pieces of potatoes, and which are fed to said cups from a hopper under which the chain of cups runs. Grooves or furrows in which to plant the potatoes are made by a share or plow, and after the potatoes are dropped they are covered by a scraper, all of which devices are mounted upon wheels.

A more full and complete description of the machine is as follows:

In the drawing, A A represent a pair of wheels on which is mounted a frame, B. In said frame is arranged an endless chain of cups, C, Fig. 1, running over and carried by a sprocket-wheel secured to the axle-tree of the driving-wheels A A, and which also passes round a sprocket-wheel, D, secured in the rear end of the frame, as shown in said Fig. 1. Said chain, as aforesaid, consists of a series of cups, *a*, and which are loosely connected to each other by a corresponding series of links, *b*, arranged on each side of the cups. E is a hopper, the opening at the bottom of which is of sufficient length to expose four of the cups of the chain under which it is adjusted to run, as shown in Fig. 1. F is the tube, extending from the front end of the machine down near to the ground. The upper end of said tube is in such relation to the chain of cups as they run over the spocket-wheel on the axle of the wheels A A that each cup becomes inverted over the mouth of the tube, and which receives from the cups the contents thereof, as will be presently shown. G, Fig. 1, is a standard, the upper end of which is hinged to the end of the frame B. To the lower end of said standard is secured a plow, H. Also, to the sides of the frame is hinged a standard, I, by means of the bifurcated arms, J, Fig. 4. To the lower end of the standard is attached a pair of scrapers, K. Said standards are connected to each other by a link, L, whereby the two standards and plows attached thereto can be raised together from the ground by means of a lever, M, Fig. 1, pivoted to the side of the frame at the point *c*, said lever being connected to the standard I by a link, N.

The practical operation of the above-described machine is as follows, viz.: The hopper being filled with potatoes, the machine is then adjusted to the line on which they are to be planted. As the machine moves forward the chain of cups revolves, and as each one passes out from under the hopper it brings with it a potato, which it carries forward and drops into the mouth of the tube or conductor F, down which it falls into the furrow made by the plow H, and which is then covered by the scrapers K, so arranged as to follow along on each side of the furrow, throwing the dirt from each side into the furrow upon the potatoes.

As aforesaid, each cup has a holding-capacity of one potato of a proper size for planting, or of a number of pieces equal to one. If more than that should be in the cups in consequence of the size of the pieces, it is left in the hopper, for it cannot pass out with the cup in which it may be, as the front edge of the hopper immediately over the cup is made sharp, and will therefore shave off all the potato in the cup that may be above the brim of it, and thus prevent clogging the movement of the machine or dropping more than the necessary amount into the hill.

In order to move the planter from place to place the plow and scraper can be raised up, as indicated by the dotted lines *c*, Fig. 1, by depressing the end of the lever M, in which position they offer no obstruction to the progress of the machine.

The driving-wheels are loose upon the axle, but cause it to turn in a forward direction by means of a clutch and spring, *f*, Fig. 3, attached to said axle, which, on turning the wheels in a backward direction, allows them to run on the axle without rotating it.

What I claim as my invention, and desire to secure by Letters Patent, is—

The endless-belt potato-dropper, as described, in combination with furrow-opener H and coverer K, pivoted to the frame and connected by bar L, operated by the levers M and N, substantially as and for the purpose set forth.

ALBERT E. PAYNE.

Witnesses:
J. H. BURRIDGE,
R. F. WILLIAMS.

(133)